United States Patent
Beier

(10) Patent No.: US 12,534,285 B1
(45) Date of Patent: Jan. 27, 2026

(54) DOUBLE CANNED INSULATED CAN KOOZIE

(71) Applicant: Andrew Beier, Hermantown, MN (US)

(72) Inventor: Andrew Beier, Hermantown, MN (US)

(*) Notice: Subject to any disclaimer, the term of this patent is extended or adjusted under 35 U.S.C. 154(b) by 0 days.

(21) Appl. No.: 18/615,745

(22) Filed: Mar. 25, 2024

Related U.S. Application Data

(60) Provisional application No. 63/492,009, filed on Mar. 24, 2023.

(51) Int. Cl.
  *B65D 81/38* (2006.01)
  *B65D 83/766* (2025.01)

(52) U.S. Cl.
  CPC ....... *B65D 81/3881* (2013.01); *B65D 83/766* (2025.01)

(58) Field of Classification Search
  CPC ............ B65D 81/3879; B65D 81/3881; B65D 81/3883; B65D 81/3886; B65D 81/3876; B65D 81/3888; B65D 81/3893; B65D 81/3865; B65D 81/3869
  See application file for complete search history.

(56) References Cited

U.S. PATENT DOCUMENTS

| | | |
|---|---|---|
| 5,335,809 A | 8/1994 | Toida et al. |
| 6,206,223 B1 | 3/2001 | Wicker |
| 6,729,496 B2 | 5/2004 | Kenny |
| D590,212 S | 4/2009 | Mancha, Jr. et al. |
| 8,720,739 B2 | 5/2014 | Bollis |
| 2005/0230586 A1 | 10/2005 | Gary |
| 2011/0147395 A1 | 6/2011 | Bolland |
| 2019/0337705 A1* | 11/2019 | McGee ................ B65D 83/766 |
| 2023/0174292 A1* | 6/2023 | Tollefspol ............. B65D 51/14 |
| | | 220/739 |

* cited by examiner

*Primary Examiner* — Javier A Pagan
(74) *Attorney, Agent, or Firm* — Albert W. Watkins

(57) ABSTRACT

A rigid plural beverage can holder has an internal spring to advance contained beverage cans upward to a selectively removable can shoulder ring. The can shoulder ring retains the top most beverage can top exposed while securing the beverage can within the can holder, thereby enabling a person to drink directly from the top of the top-most can. The can shoulder ring is selectively removable from the beverage can holder to permit beverage cans to be selectively inserted into and removed from the beverage can holder. The beverage can holder preferably has insulated walls to help to maintain a desired temperature of the beverages held within the beverage cans.

15 Claims, 1 Drawing Sheet

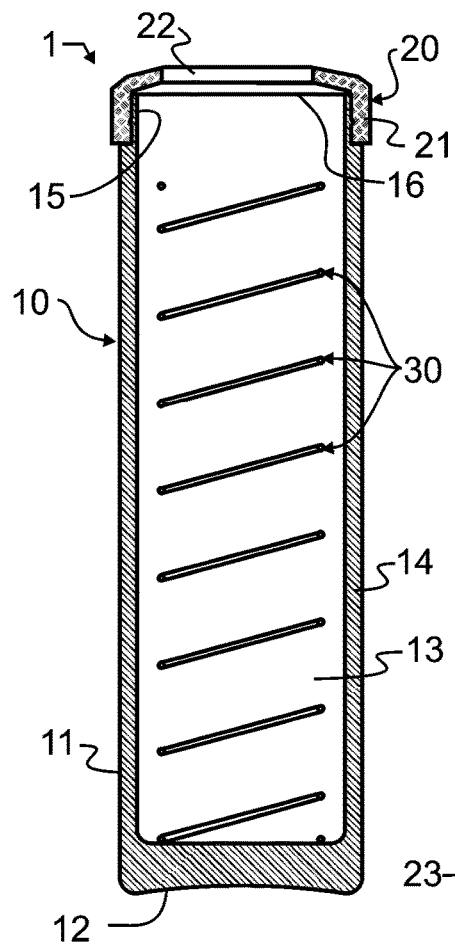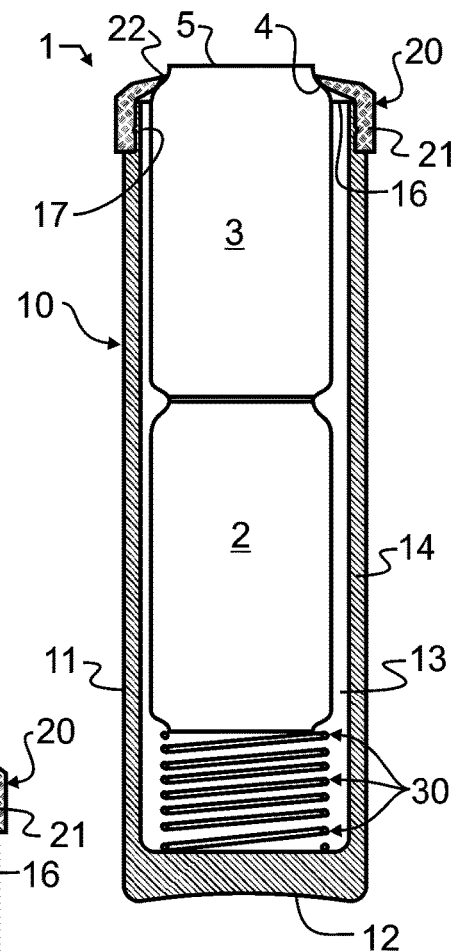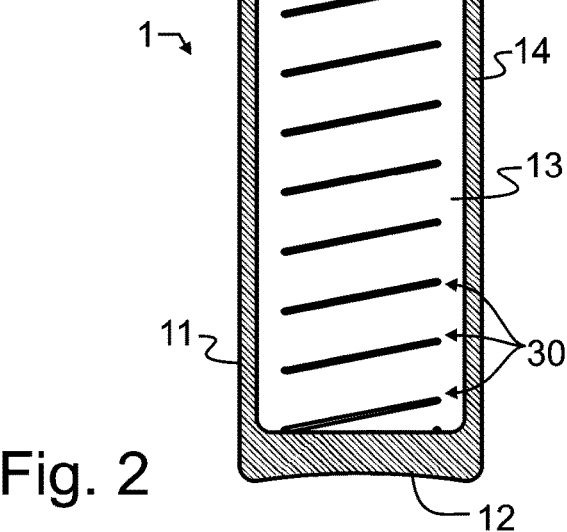

DOUBLE CANNED INSULATED CAN KOOZIE

CROSS REFERENCE TO RELATED APPLICATIONS

The present application claims the benefit of U.S. provisional patent application 63/492,009 filed Mar. 24, 2023 of like title and inventorship, the teachings and entire contents which are incorporated herein by reference.

BACKGROUND OF THE INVENTION

1. Field of the Invention

The present invention pertains generally to beverage receptacles, and in a more particular manifestation to an insulated container holder having plural rigid, removable inner containers.

2. Description of the Related Art

Insulated beverage carriers are common, and constructed to provide a person their beverage of choice at the desired temperature throughout the course of consuming the beverage. Many beverages have an ideal temperature range for optimum flavor and desired effect. Oftentimes during the warmer months a cold beverage is preferred, and during the cooler months a hot beverage is preferred. In particular when dealing with the warmer months, the cold beverages of choice often come in standard sized twelve ounce aluminum cans. There are many common wraps that go around the standard can to help keep the temperature of the contents more consistent.

While the standard can koozie provides a holder for a single can, a better device would allow for the carrying of more than one can, while keeping the cans at the desired temperature. A traditional koozie is also made from a flexible fabric like neoprene, which can only hold one can because it lacks structure to keep multiple cans stacked on top of each other while drinking from the top can, although such a device exists in U.S. Pat. No. 8,720,739 by Bollis entitled "Beverage Can Holder and Cooler Technology," the teachings and contents which are incorporated herein by reference. A rigid holder exists in U.S. Pat. No. 5,335,809 by Toida et al. entitled "Heat Insulating Container," the teachings and contents which are incorporated herein by reference, which allows for multiple cans to be transported while stacked. Nevertheless, the Toida container is not designed to allow for the consumer to drink from the can directly. Instead, the Toida container has an offset from the can to the drinking edge, so the device gets messy when used, and may require cleaning if the beverage is changed from one can to the next. Furthermore, the Toida container must have the same number of beverage containers in it at all times when consuming a beverage, and thus when switching from one can to the next will require the open can to swap positions.

Both of the aforementioned patents also have an additional problem insofar that aluminum cans don't have a good means for being fully emptied after a consumer consumes a majority of the beverage. If an upper container is swapped to a lower position it will almost certainly not be empty. Consequently, this now mostly-emptied lower container will spill some beverage as the now top can also comes close to being empty, since this will require a person to tilt the holder to nearly upside down orientation. The lower and mostly-emptied container will then spill some of the remaining contents and foul the inside of the whole container. This shortcoming of aluminum cans is made even more profound when utilizing the invention shown in US2005/0230586 by Gary entitled "Reversible End Beverage Holder," the teachings and contents which are incorporated herein by reference, which holds two beverages simultaneously and has a detachable base that defines the bottom of the receptacle and can be swapped from the bottom to the top allowing for the unopened can to be consumed. Unfortunately as described by the Gary patent, the consumed can is still retained when the switch is made, and thus the incompletely consumed beverage is likely going to spill small amounts with each drink and make a mess.

When looking at the shortcomings that these aforementioned patents have, a solution may look viable with US2011/0147395 by Bolland entitled "Multiple Container Retaining Device and Method for Using Same," the teachings and contents which are incorporated herein by reference. However, this Bolland solution also suffers from a couple major drawbacks. The first drawback is this only works if both the top and bottom can are either the same beverage, or it is desirable to combine them. The second drawback is that the bottom can will either never fully empty due to a vapor lock if the connecting tube is of small diameter, or will be impossible to easily engage if a large diameter tube is used. Even if a connecting tube of appropriate diameter is found and used, the penetrating distance of the connecting tube will define the maximum quantity of liquid that can be extracted from the combined containers. Even if a vapor lock is avoided by placing multiple smaller diameter tubes, the next problem is the flow rate of these smaller tubes. Each time a person attempts to take a drink from liquid that is below the top can, they will end up waiting for the beverage to flow through the tube(s) to be consumed. Additionally this flowing through the tubes will also cause enough turbulence that any carbonation in the beverage will be reduced, potentially enough that the beverage will be made flat and thus undesirable. A third drawback is the risk that the connecting tube does not appropriately seal between the top and bottom cans, leaving one end or even both prone to leaking and again undesirable contamination and mess within the Bolland retaining device.

Additional U.S. patents of varying relevance, the relevant teachings and contents which are incorporated herein by reference, include: U.S. Pat. No. 6,206,223 by Wicker entitled "Can Cooler"; U.S. Pat. No. 6,729,496 by Kenny entitled "Beverage Can Holder"; and D590,212 by Mancha, Jr. et al. entitled "Beverage Holder".

As may be apparent from the foregoing discussions, in spite of the enormous advancements and substantial research and development that has been conducted, there still remains a need for an insulated can koozie that is easily and intuitively used, which holds two or more beverage cans while keeping the top most beverage in a ready to consume position, which allows the consumer to drink directly from the beverage can without the beverage holder getting messy, and which keeps the beverage cans near the desired temperature for consumption.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a can koozie. The can koozie comprises a can container, a can shoulder ring, and a can advancing spring. The can container has a base and sidewalls defining an interior volume, and a can container opening distal to the base. The can container is configured to receive at least two beverage cans through the opening into the interior volume and contain the at least two beverage cans therein. The can shoulder ring is removably affixed to the can container adjacent the can container opening. A can shoulder ring opening in the can shoulder ring has a diameter less than a diameter of the can container opening and is configured to retain individual ones of the at least two beverage cans within the interior volume. A can advancing spring is located within the interior volume and rises from the base. The can advancing spring is configured to maintain the at least two beverage cans compressed and captured between the can advancing spring and the can shoulder ring and is also configured to maintain an individual one of the at least two beverage cans compressed and captured between the can advancing spring and the can shoulder ring while also maintaining a can top of the individual one of the at least two beverage cans exposed in a position for a contents of the individual one of the at least two beverage cans to be consumed by a person directly from the can top of the individual one of the at least two beverage cans.

In a second manifestation, the invention is, in combination, a beverage can container and at least two beverage cans. The at least two beverage cans each comprise: a can top that when opened is configured to dispense a beverage; a generally cylindrical can body; and a can shoulder decreasing in diameter between the generally cylindrical can body and the can top. The beverage can container comprises: a can container having a base and sidewalls defining an interior volume, and a can container opening distal to the base, the can container receiving the at least two beverage cans through the opening into the interior volume and containing the at least two beverage cans therein; a can shoulder ring selectively removably affixed to the can container adjacent the can container opening; a can shoulder ring opening in the can shoulder ring having a diameter less than a diameter of the can container opening and retaining individual ones of the at least two beverage cans within the interior volume; and a can advancing spring within the interior volume and rising from the base, the can advancing spring maintaining the at least two beverage cans compressed and captured between the can advancing spring and the can shoulder ring and also maintaining an individual one of the at least two beverage cans compressed and captured between the can advancing spring and the can shoulder ring while also maintaining a can top of the individual one of the at least two beverage cans exposed in a position for a contents of the individual one of the at least two beverage cans to be consumed by a person directly from the can top of the individual one of the at least two beverage cans.

In a third manifestation, the invention is a method of transporting a plurality of beverage cans while selectively dispensing a beverage from a single one of the plurality. In accord with the method, a can shoulder ring is removed from a can container, thereby enlarging an opening into the can container. A beverage can is inserted through the opening into the can container. A spring is compressed within the can container simultaneous with the inserting step. The beverage can is suspended upon the spring within the can container and adjacent to the can container opening. The inserting, compressing, and suspending steps are repeated at least once. The can shoulder ring is reaffixed to the can container, thereby capturing the beverage cans within the can container. A top of the last inserted and suspended beverage can top is opened. A beverage contained within the last inserted and suspended beverage is dispensed therefrom.

OBJECTS OF THE INVENTION

Exemplary embodiments of the present invention solve inadequacies of the prior art by providing a rigid plural beverage can holder with an internal spring to advance the contained can(s) upward to a rim which retains the top most beverage while allowing the consumer to drink directly from the top most can. The beverage can holder preferably has insulated sides to maintain the desired temperature of the beverages.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a beverage can holder which holds one or more beverage cans while keeping the top most beverage in a ready to consume position. A second object of the invention is to have the beverage can holder which allows the consumer to drink directly from the beverage can without the beverage holder getting messy. Another object of the present invention is to keep the beverage cans near the desired temperature for consumption. A further object of the invention is to allow for a plurality of beverage cans to be held in the beverage holder.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 1, 2, and 3 illustrate a preferred embodiment double canned insulated can koozie by vertical plane section without cans, with a single can, and with two cans, respectively.

DESCRIPTION OF THE PREFERRED EMBODIMENT

Manifested in a preferred embodiment of the invention illustrated in FIG. 1, a double canned insulated can koozie 1 is comprised of three primary components: an insulated can container 10; a can shoulder ring 20; and a can advancing spring 30. Can shoulder ring 20 is most preferably removably affixed to insulated can container 10, and so can be manually separated therefrom. Can advancing spring 30 is likewise preferred to be separate and removable from both of the insulated can container 10 and can shoulder ring 20.

Insulated can container 10 has a generally cylindrical exterior wall 11 that terminates at a base 12, and a generally cylindrical interior wall 13. Between interior wall 13 and exterior wall 11 there is preferably a gap that defines insulation 14. In various embodiments, insulation 14 will for exemplary and non-limiting purpose comprise: an air gap; a vacuum; a low thermal conductivity gas fill; polymeric, ceramic, glass or other similar insulating fill; or the like. In some alternative embodiments, the material used in the fabrication of insulated can container 10 intrinsically provides thermal insulation. For exemplary and non-limiting purpose, in some alternative embodiments a rigid foamed polymer provides both structural strength and rigidity, while also providing thermal insulation. In some of these alternative embodiments, the rigid foamed polymer will further comprise a solid, non-foamed skin that offers even greater structural strength defined by the formation of a solid cylindrical exterior side wall 11 and a solid interior wall 13, while the core material defining insulation 14 comprises a foamed internal structure. Optionally but preferably, the top of exterior wall 11 distal to base 12 narrows, defining a top ring 15. The top of interior wall 13 distal to base 12 defines an opening 16 that provides access into an interior volume defined by interior wall 13.

Can shoulder ring 20 has an annular engagement 21 that is configured to engage securely with top ring 15, or other equivalent structure adjacent to opening 16, to partially close opening 16. In the preferred embodiment, an annular groove 23 is provided in annular engagement 21 that is designed to mate with an annular ring 17 protruding exteriorly from top ring 15. When annular ring 17 snaps into annular groove 23, such as illustrated in the Figures, then can shoulder ring 20 is held securely onto top ring 12. Nevertheless, in alternative embodiments other affixing apparatus removably secure can shoulder ring 20 onto top ring 12. For exemplary and non-limiting purpose, in alternative embodiments such affixing apparatus will include one or more of: a friction fit, threading, bayonet-style couplers, circumferential clamps, hose barbs, and a myriad of other fasteners as are known in the mechanical arts.

A can-top opening 22 is provided in can shoulder ring 20 that, as visible in FIGS. 2 and 3, is of a diameter suitable to engage with the tapered top shoulder of a can such as a beverage can 2 and thereby prevent can 2 from sliding out of the top of the can container 10, but not so far as to obstruct the user's ability to drink directly from the can. In preferred embodiment double canned insulated can koozie 1, can shoulder ring 20 is made of a material which holds a can top centered within can-top opening 22, holding the can within interior wall 13 against both the force of the spring and the force of gravity when preferred embodiment double canned insulated can koozie 1 is inverted to take a drink. In some embodiments, can shoulder ring is fabricated from a high friction elastomer of sufficient hardness or durometer to retain a can 2 against the force of can advancing spring 30, while in other alternative embodiments a rigid material is used.

As noted herein above, optionally but preferably, the top of exterior wall 11 distal to base 12 narrows, defining a top ring 15 of reduced outside diameter. This allows the exterior diameter of annular engagement 21 to approach that of the outer diameter of exterior wall 11. This arrangement reduces the likelihood that annular engagement 21 will get accidentally pressed or separated from exterior side wall 11. In some alternative embodiments, the outer diameter of annular engagement 21 is dimensioned to be slightly less than the outer diameter of exterior wall 11, thereby further reducing the chance of can shoulder ring 20 being separated from insulated can container 10 during handling and transport. Nevertheless, in the case of snap fittings such as barbed fittings or rings and annular grooves, intentional separation may also be more difficult. Consequently, those skilled in the art of suitable couplings will be able to consider the various trade-offs at design time in light of the present disclosure to select a suitable combination of coupler type and dimension.

The location of a can 2 firmly against and partially within can-top opening 22, such as illustrated in FIG. 2, is reliant upon can advancing spring 30. Can advancing spring 30 has a spring constant selected so that it provides slightly more lift than the weight of a full can 2 for the compression distance of one can.

Spring 30 is illustrated as a well-known helically wound spring such as might, for exemplary and non-limiting purpose, be formed from winding a spring metal composition about a mandrel as is known in the art of spring making. Nevertheless, in alternative embodiments, can advancing spring 30 will comprise any suitable resilient member that is able to generate a suitable spring constant or resilience. In yet further alternative embodiments, can advancing spring 30 will comprise other materials and apparatus that will provide the desired long throw required to compress from the maximum compression illustrated in FIG. 3 to the expanded state of FIG. 2 required to maintain can 2 compressed and captured between can advancing spring 30 and can shoulder ring 20. For exemplary and non-limiting purpose, such alternative apparatus include various accordion pleated spring geometries, certain gas-filled cylinders, certain foamed compositions and geometries, and other passive or active spring-alternatives as are known in the mechanical arts and which will be understood to be incorporated herein as a different alternative embodiment of can advancing spring 30.

Most desirably, and as visible from a comparison of each of the Figures, the resultant effect of an appropriately configured can advancing spring 30 is that as each unopened can 2 is added into the can container 10, the top of the newly added can is higher than the top ring 15 of the can container, but the bottom of the added can is below the top ring 15 of the can container. This process is repeated for each can added to preferred embodiment double canned insulated can koozie 1. Each newly added can drops into, but also is easily removable from, the top of insulated can container 10, while also pushing the previously added can(s) farther toward base 12. Conversely when the contents of the top can are consumed, and the can shoulder ring 20 is removed, the can(s) will automatically advance up and allow for the easy removal of the consumed can, and the re-installing of can shoulder ring 20.

While in preferred embodiment double canned insulated can koozie 1 the length of insulated can container 10 has been selected to hold two standard twelve-ounce beverage cans, it will be understood that other dimensions may be used. Further, there are known to exist both smaller and larger beverage containers besides the common twelve-ounce can that can be accommodated within an insulated can container 10. Consequently, where smaller beverage containers are used, more than two may be inserted within preferred embodiment double canned insulated can koozie 1, and where a larger beverage container is used, a single container may be all that can be accommodated. In alternative embodiments, can koozies will be constructed in accord with the teachings of the present invention that are configured for alternative can sizes and quantities.

Most preferably, the outer diameter of can advancing spring 30 is greater than the inner diameter of can-top opening 22. This allows the entire preferred embodiment double canned insulated can koozie 1 to be carried about without fear of losing the can advancing spring 30. In addition, and as visible in FIGS. 2 and 3, a suitable diameter will allow a prior art can 2 to nest securely just inside the spring diameter, providing easy fit and alignment between the can 2 and spring 30.

In some alternative embodiments, other geometries and diameters are used for can advancing spring. For exemplary and non-limiting purpose, the diameter of can advancing spring 30 will in some alternative embodiments vary along the vertical height of can advancing spring 30. As but one example, the base of can advancing spring 30 will in some alternative embodiments have a diameter just smaller than the interior diameter of interior wall 13, and distal thereto have a smaller diameter that fits inside of the bottom rim of can 2. In some alternative embodiments, the base of can advancing spring 30 is permanently affixed to base 12.

From the foregoing figures and description, several additional features and options become more apparent. First of all, insulated can holder 10 may be manufactured from a variety of materials, including metals, resins and plastics, ceramics, or even combinations, composites, or laminates of the above. The specific material used may vary. Preferred embodiment double canned insulated can koozie 1 utilizes a void space for insulation 14 with an exterior wall 10 that is suitably rigid. However, in some alternative embodiments foamed or other types of insulation 14 will be used, and the particular insulation 14 may bias the selection of other materials. It is preferable that all materials are sufficiently tough and durable to not fracture, even when great forces are applied thereto such as when the koozie is dropped. Most preferably, stainless steel with a void or vacuum interior is the preferred material for the insulated can holder, which ensures both a durable product and the ready ability to clean the preferred embodiment double canned insulated can koozie 1 in an automatic dishwasher.

In addition, while a beverage can such as is commonly used to hold and distribute soda pop, juices, energy drinks, sparkling water, protein shakes, and other beverages is described herein above, other fluids and liquids may also be contained in such cans. For exemplary and non-limiting purposes, various soups, yogurts, frozen or partially frozen treats, and other fluid or semi-fluid compositions are known to be prepared and packaged for consumption and will in some embodiments be contained in cans 2, 3. For the purposes of the present invention, a beverage can will be defined herein to include such fluid or semi-fluid compositions that are prepared and packaged for personal consumption directly out of the can.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A can koozie, comprising:
a can container having a base and sidewalls defining an interior volume, and a can container opening distal to said base, said can container configured to receive at least two beverage cans through said opening into said interior volume and contain said at least two beverage cans therein, each one of said at least two beverage cans having a generally cylindrical can body, a can top, and can shoulder decreasing in diameter between said generally cylindrical can body and said can top;
a can shoulder ring selectively removably affixed to said can container adjacent said can container opening;
a can shoulder ring opening in said can shoulder ring having a diameter less than a diameter of said can container opening and configured to engage with said can shoulder adjacent said can top and thereby retain individual ones of said at least two beverage cans within said interior volume; and
a can advancing spring within said interior volume and rising from said base, said can advancing spring having a spring constant selected to provide slightly more lift than the weight of a full can for the compression distance of one can, and configured to maintain said at least two beverage cans compressed and captured between said can advancing spring and said can shoulder ring and also configured to maintain an individual one of said at least two beverage cans compressed and captured between said can advancing spring and said can shoulder ring while also maintaining a can top of said individual one of said at least two beverage cans exposed in a position for a contents of said individual one of said at least two beverage cans to be consumed by a person directly from said can top of said individual one of said at least two beverage cans.

2. The can koozie of claim 1, wherein said base and said sidewalls each further comprise an insulated wall configured to maintain a temperature of said interior volume.

3. The can koozie of claim 2, wherein said insulated wall further comprises:
an interior wall;
an exterior wall; and
a gap between said interior wall and said exterior wall.

4. The can koozie of claim 1, wherein said can container sidewalls further comprise a top ring adjacent to said can container opening, said top ring having an exterior diameter less than a diameter of said container sidewalls intermediate between said can container opening and said base.

5. The can koozie of claim 4, wherein said can shoulder ring further comprises an annular engagement configured to fit substantially within said top ring.

6. The can koozie of claim 1, wherein said can advancing spring comprises a helically wound spring metal.

7. The can koozie of claim 1, wherein said can advancing spring comprises an elastomeric polymer.

8. In combination, a beverage can container and at least two beverage cans, said at least two beverage cans each comprising:
a can top that when opened is configured to dispense a beverage;
a generally cylindrical can body; and
a can shoulder decreasing in diameter between said generally cylindrical can body and said can top;
said beverage can container comprising:
a can container having a base and sidewalls defining an interior volume, and a can container opening distal to said base, said can container receiving said at least two beverage cans through said opening into said interior volume and containing said at least two beverage cans therein;
a can shoulder ring selectively removably affixed to said can container adjacent said can container opening;
a can shoulder ring opening in said can shoulder ring having a diameter less than a diameter of said can container opening and retaining individual ones of said at least two beverage cans within said interior volume wherein said can shoulder ring opening is configured to engage with said can shoulder adjacent said can top of an individual one of said at least two beverage cans; and
a can advancing spring within said interior volume and rising from said base, said can advancing spring having a spring constant selected to provide slightly more lift than the weight of a full can for the compression distance of one can, and maintaining said at least two beverage cans compressed and captured between said can advancing spring and said can shoulder ring and also maintaining an individual one of said at least two beverage cans compressed and captured between said can advancing spring and said can shoulder ring while also maintaining a can top of said individual one of said at least two beverage cans exposed in a position for a contents of said individual one of said at least two beverage cans to be consumed by a person directly from said can top of said individual one of said at least two beverage cans.

9. The combination beverage can container and at least two beverage cans of claim 8, wherein said base and said sidewalls each further comprise an insulated wall configured to maintain a temperature of said interior volume.

10. The combination beverage can container and at least two beverage cans of claim 9, wherein said insulated wall further comprises:
   an interior wall;
   an exterior wall; and
   a gap between said interior wall and said exterior wall.

11. The combination beverage can container and at least two beverage cans of claim 8, wherein said can container sidewalls further comprise a top ring adjacent to said can container opening, said top ring having an exterior diameter less than a diameter of said container sidewalls intermediate between said can container opening and said base.

12. The combination beverage can container and at least two beverage cans of claim 11, wherein said can shoulder ring further comprises an annular engagement configured to fit substantially within said top ring.

13. The combination beverage can container and at least two beverage cans of claim 8, wherein said can advancing spring comprises a helically wound spring metal.

14. The combination beverage can container and at least two beverage cans of claim 8, wherein said can advancing spring comprises an elastomeric polymer.

15. A method of transporting a plurality of beverage cans while selectively dispensing a beverage from a single one of the plurality, comprising the steps of:
   removing a can shoulder ring from a can container and thereby enlarging an opening into said can container;
   inserting a beverage can through said opening into said can container;
   compressing a spring within said can container simultaneous with said inserting step;
   suspending said beverage can upon said spring within said can container and adjacent to said can container opening;
   repeating said inserting, compressing, and suspending steps at least once;
   reaffixing said can shoulder ring to said can container and thereby capturing said beverage cans within said can container;
   opening a top of the last inserted and suspended beverage can top; and
   dispensing a beverage contained within said last inserted and suspended beverage can therefrom.

* * * * *